United States Patent [19]

Marek

[11] Patent Number: 4,955,234
[45] Date of Patent: Sep. 11, 1990

[54] SENSOR

[75] Inventor: Jiri Marek, Reutlingen, Fed. Rep. of Germany

[73] Assignee: Robert Bosch GmbH, Stuttgart, Fed. Rep. of Germany

[21] Appl. No.: 328,936

[22] Filed: Mar. 24, 1989

[30] Foreign Application Priority Data

May 3, 1988 [DE] Fed. Rep. of Germany ....... 3814952

[51] Int. Cl.⁵ ............................................. G01P 15/12
[52] U.S. Cl. ..................................... 73/517 R; 338/5
[58] Field of Search ...................... 73/517 R; 280/735; 338/2, 5, 46

[56] References Cited

U.S. PATENT DOCUMENTS 4,488,445  12/1984  Aske ................................. 73/517 R
4,522,072   6/1985  Sulouff et al. .................... 73/517 R

FOREIGN PATENT DOCUMENTS 62-118529  5/1987  Japan .
1000456    8/1965  United Kingdom ............. 73/517 R

OTHER PUBLICATIONS

M. Korner et al., "Integrated Piezo-Resistive Acceleration Pick-ups, ", *Acta Imeko* 1979, pp. 583–590.

Primary Examiner—John Chapman
Attorney, Agent, or Firm—Michael J. Striker

[57] ABSTRACT

A sensor for acceleration measurement, for example for automatic release of occupant protective devices in vehicles, especially power vehicles, in which during deceleration of the vehicle or vehicle part a control signal is produced. The sensor comprises a support, a pendulum with a seismic mass mounted on two bending bars formed in the support, resistances each provided on a respective one of the bending bars, and further resistances each arranged on the support in the region between the bending bars and on the pendulum in the region between the bending bars, the first mentioned resistances and the further resistances being connected in a Wheatstone bridge.

9 Claims, 2 Drawing Sheets

SENSOR

BACKGROUND OF THE INVENTION

The present invention relates to a sensor for measuring accelerations, such as for example, for automatic release of occupant protecting devices in power vehicles.

Sensors of the above mentioned general type are known in the art. In a known sensor during deviation from a course of movement of the vehicle or vehicle part a control signal is produced. The sensor has a support of monocrystalline material in which a pendulum with a seismic mass mounted on at least two bending bars is etched and a resistance is arranged on each of the bending bars. A pendulum is suspended on a torsion bar, and twisting of the bars is determined by expansion measuring strips arranged in a Wheatstone bridge. Such sensors are relatively strongly transversely sensitive and have no warning device in the event of break in the torsion bars.

SUMMARY OF THE INVENTION

Accordingly, it is an object of the present invention to provide a sensor of the above mentioned general type which avoids the disadvantages of the prior art.

In keeping with these objects and with others which will become apparent hereinafter, one feature of the present invention resides, briefly stated, in that on the support formed as a silicium plate in the region between the bending bars and on the pendulum in the region between the bending bars, a respective resistance is arranged, and these resistances are connected with the resistances located on the bending bars in a Wheatstone bridge.

When the sensor is designed in accordance with the present invention, it eliminates the disadvantages of the prior art, and it determines the acceleration in an especially simple and accurate manner. The transverse sensitivity to the acceleration force in the plane of the pendulum is reduced. With the use of two bending bars, the transverse signals resulting from a torsion of the bars are substantially avoided. No disturbances signals resulting from a different thermal expansion of the pendulum and the substrate occur. Futhermore, defect signals can be avoided by an error adjustment of an individual bar. This signal computation is especially simple. By the special arrangement of the resistance in the Wheatstone bridge, a simple operational testing of the mechanical parts of the sensor, for example, especially its pendulum is possible. The electrically closed circuit of the resistances in the Wheatstone bridge breaks by a mechanical damage of the webs. Thereby an electrical control of the mechanical condition of the sensor is possible. By the arrangement of the resistances, the swinging seismic masses such as for example the whole pendulum, can be introduced in the electric monitoring.

In accordance with another feature of the present invention, the resistance is arranged on the end of the pendulum which faces away of the bending bars.

The resistance can also be arranged on the pendulum as close as possible to the end of the pendulum facing toward the bending bars.

The bending bars can extend substantially parallel to the longitudinal axis of the pendulum.

The bending bars can be in alignment with the outer edges of the pendulum.

Finally, in the region of the pendulum, a bond wire can be arranged which limits the movement of the pendulum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
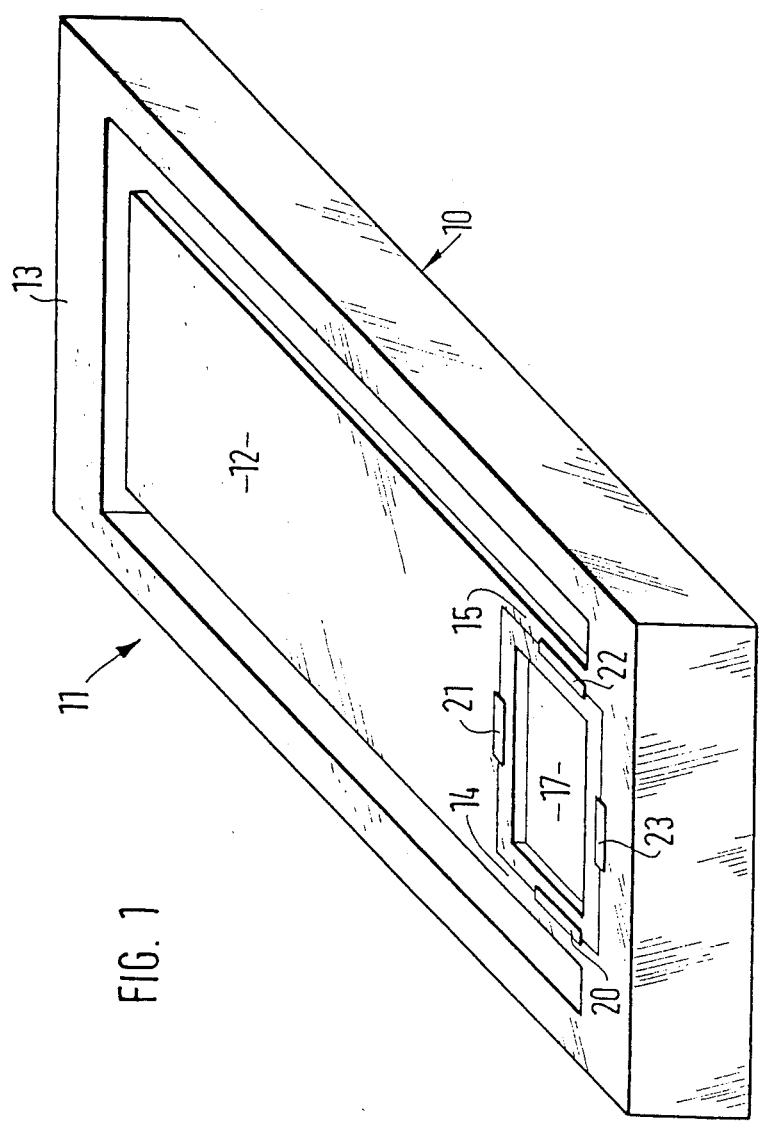
FIG. 1 is a perspective view of the sensor in accordance with the present invention.

FIG. 1 shows a silicium plate 10, from which a sensor 11 is produced. A pendulum 12 of the sensor 11 which serves as a seismic mass, is etched in its upper surface. Therefore an outer frame 13 is produced. Both the anisotrope and also a selective etching technique can be used for this purpose. Furthermore, this is also possible with manufacturing processes which are conventionally known for the IC-production.

The pendulum 12 is etched from the upper surface so that it has two webs with which it is elastically suspended in the frame 13. The webs 14 and 15 extend parallel, and particularly in alignment to the outer edges of the pendulum 12. A chamber 17 is etched from the pendulum 12 between both webs 14 and 15, so that the webs 14 and 15 can operate as bending bars. The further the webs 14, 15 are spaced from one another, especially when they are aligning with the outer edges of the pendulum 19, the more it is possible to avoid transverse forces which occur due to torsion.

The webs 14 and 15 can also have any other form. What is important is that the webs are located with a maximum possible distance from one another, in other words, with a maximum possible length of the chamber 17. Thereby during bending torsion of the webs is substantially avoided. It is to be understood that it is also possible for increasing the operational safety, to arrange a third web in the region of the chamber 17.

For determining the bending of the webs, or in other words, for determining the deviation of the pendulum 12, four expansion-sensitive resistances 20–23 are arranged on the pendulum 12 and the frame 13. They are connected with one another in a Wheatstone bridge. The oppositely located resistances 20 and 22 are arranged respectively on the webs 14 and 15. The resistances 21 and 23 are located opposite to one another on the housing 10 or on the pendulum 12 in the region of the chamber 17.

The mechanic condition of the pendulum 12 can be controlled electrically by the resistances 20–23 which are connected in the Wheatstone bridge. When the webs 14 and 15 are damaged, for example broken from inside, the electric closed circuit of the Wheatstone bridge is interrupted. In the embodiment shown in FIG. 1, the electric conductors of the bridge circuit are minimized. Resistances 20–23 can be produced by diffusion or implanting on the webs and the pendulum or applied with thin or thick layer technique in form of expansion measuring strips which operate in accordance with the piezo-resistive principle.

Figure 2:
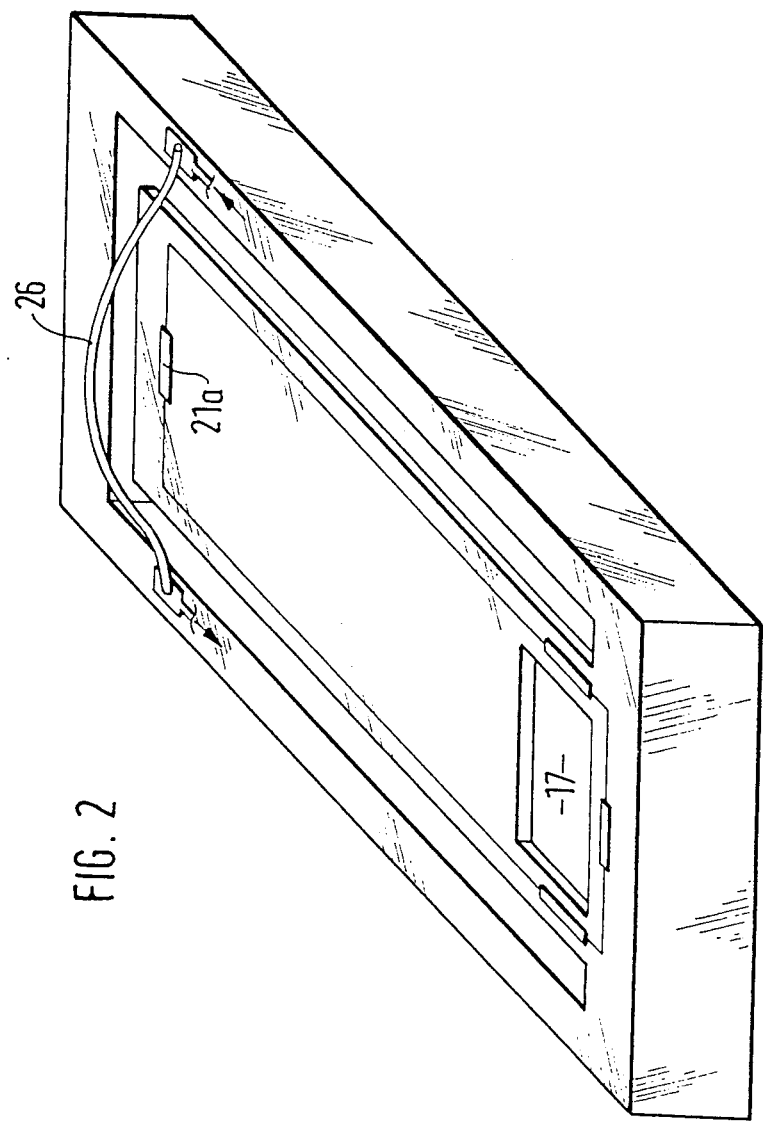
FIG. 2 is a view substantially corresponding to the view of FIG. 1 but showing another embodiment of the present invention.

As can be seen in FIG. 2, the resistance 21 can be arranged on the end of the pendulum 13 which faces away of the chamber 17. Thereby it is possible to monitor the mechanical operational effiency of the whole pendulum 19, since the electrical conductors are guided through the whole periphery of the pendulum 12. If the electrical conductors are damaged at any point of the pendulum, or in other words the pendulum 12 is mechanically damaged, the electric closed current circuit is interrupted and thereby a defective signal is produced.

Furthermore, in the region of the free end of the pendulum 12 a bond wire 26 is clamped over the pendulum. The bond wire 26 is fixed on the frame 13 and is a part of an electric circuit. When the pendulum vibrates too far, the bond wire 26 is destroyed by the pendulum 12 and the electrical circuit is interrupted. Thereby a so-called overloading protection is possible by a vibration limiting or operational monitoring of the pendulum 12.

From the Wheatstone bridge connection of the resistances 20-23, electrical conduits lead to a not shown control device. This control device can release occupant protecting devices in a vehicle or other systems such as seat belt, air bags, overrolling bracket, warning light devices, central locking or anti-blocking systems for the brakes, or control the chassis regulation.

The operation of an acceleration sensor is generally known and not described here in great detail. When the pendulum 13 deviates from its rest position, the webs 14 and 15 are bent in the region of their resistances 20, 22 and produce in them a proportional resistance change. The resistance change is evaluated in the evaluating circuit and supplied to the control device.

It will be understood that each of the elements described above, or two or more together, may also find a useful application in other types of constructions differing from the types described above.

While the invention has been illustrated and described as embodied in a sensor for acceleration measurements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sensor for measuring acceleration of a vehicle and generating a control signal in response to deviation of the vehicle from a permissible course of movement for automatic release of vehicle occupant protective means, said sensor comprising a support formed as a silicium plate; a pendulum with a seismic mass; two spaced bending bars for supporting said pendulum on said support; two resistances arranged on said bending bars, respectively; and two further resistances arranged on said pendulum and said support, respectively, in a region between said two bending bars, said two resistances and said two further resistances being connected in a Wheatstone bridge.

2. A sensor as defined in claim 1, wherein said pendulum has an end which faces away of said bending bars, one of said further resistances being arranged on said end of said pendulum.

3. A sensor as defined in claim 1, wherein said pendulum has an end which faces toward said bending bars, one of said further resistances being arranged on said pendulum close to said end.

4. A sensor as defined in claim 1, wherein said pendulum has a longitudinal axis, said bending bars extending substantially parallel to said longitudinal axis of said pendulum.

5. A sensor as defined in claim 1, wherein said pendulum has outer edges, said bending bars being arranged in alignment with said outer edges of said pendulum.

6. A sensor as defined in claim 1; and further comprising a bond wire arranged in the region of said pendulum and limiting the movement of said pendulum.

7. A sensor as defined in claim 1, wherein said support is composed of a monocrystalline material.

8. A sensor as defined in claim 1, wherein said pendulum with said bending bars are etched in said support.

9. A sensor for measuring acceleration of a vehicle and generating a control signal in response to deviation of the vehicle from a permissible course of movement for automatic release of vehicle occupant protective means, said sensor comprising a support; a pendulum with a seismic mass; two spaced bending bars for supporting said pendulum on said support; resistances each arranged on a respective one of said two bending bars; and further resistances each arranged on said support, respectively in a region between said two bending bars and on said pendulum in a region between said two bending bars, said resistances and said further resistances being connected in a Wheatstone bridge.

* * * * *